Feb. 24, 1970 T. L. DAUGHERTY 3,496,793
SUBMERGENCE PRESSURE THRUST COMPENSATOR
Filed Aug. 27, 1968
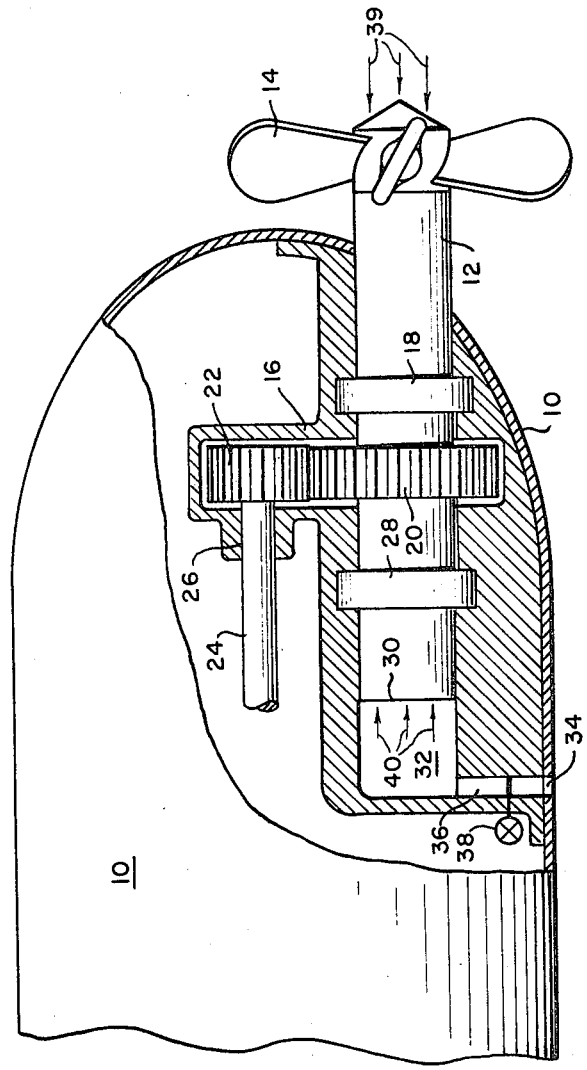
INVENTOR
THOMAS L. DAUGHERTY
BY Donn McGiehan
AGENT
D. Hodges
ATTORNEY 
United States Patent Office 3,496,793
Patented Feb. 24, 1970

---

3,496,793
SUBMERGENCE PRESSURE THRUST COMPENSATOR
Thomas L. Daugherty, Arnold, Md., assignor to the United States of America as represented by the Secretary of the Navy
Filed Aug. 27, 1968, Ser. No. 755,547
Int. Cl. F16h *1/12, 1/20;* B63q *8/00*
U.S. Cl. 74—421                                   5 Claims

---

ABSTRACT OF THE DISCLOSURE

A propeller shaft thrust compensator utilizing environmental sea water pressure applied to the inboard end surface of the shaft to counteract the thrust caused by sea water pressure on the exposed end surface of the propeller shaft.

The invention described herein may be manufactured and used by or for the Government of the United States of America for governmental purposes without the payment of any royalties thereon or thereafter.

---

BACKGROUND OF THE INVENTION

This invention relates generally to thrust bearings and more particularly to thrust compensators for use in deep submergence vehicles where the compensating effect is produced by the application of environmental sea water pressure to the inboard end surface of the propeller shaft.

While this invention has particular utility on submarines and other deep submergence vehicles for the obvious reason that sea water pressure is much greater in these applications than the internal pressure in the hull, the invention will find utility in any shaft application which passes through a seal from an area of high pressure to an area of lower pressure. The description of the use of the invention on propulsion shafts is therefore intended as illustrative only and not as limiting the invention thereto.

A shaft passing through a seal in a submarine hull or deep submergence vehicle is subjected to a hydrostatic pressure of the water at the exposed end and to substantially atmospheric pressure which is commonly maintained in the interior of the hull of a submarine or submersible vehicle. The pressure differential prevailing produces a thrust inwardly on the end of the propeller shaft and is equal to approximately the shaft end area times the hydrostatic pressure. As an example, the thrust on a 2-inch propeller shaft due to hydrostatic pressure only amounts to approximately 1,400 lbs. at 1,000 feet of depth. At a depth of 10,000 ft. the thrust would obviously be 14,000 lbs.

Thrust of these magnitudes are commonly encountered particularly in a deep submergence vehicle, and require compensation in some manner. Compensation has normally taken the form of a mechanical thrust bearing, such as the Kingsbury type, which is expensive, requires lubrication, is space consuming, and adds considerable weight to the vehicle. The space consumption and weight are quite undesirable, particularly in deep submergence vehicles; however, may be tolerated in submarines.

SUMMARY

The purpose of the instant invention is to provide a propeller shaft thrust compensator which eliminates the need for and the disadvantages of conventional thrust bearings of the Kingsbury type, for example. By providing a cavity or chamber at the inboard end of the propeller shaft and connecting this chamber via a conduit to the environmental water hydrostatic pressure, the thrust produced by the hydrostatic pressure on the exposed end of the propeller shaft is automatically eliminated. The inward thrust on the propeller shaft remaining will be that caused by propulsion reaction produced by the propeller. This reaction thrust in some application is nominal compared to the thrust due to the hydrostatic pressure on the outboard end of the shaft. This reaction thrust may be easily compensated for by the use of thrust bearings of much smaller size and weight than would be required should the bearing be required to oppose the total thrust on the shaft.

Accordingly, it is the principal object of this invention to provide a thrust compensator of small size and low weight used in a water environment, for vehicle propulsion shafts which pass through a submerged portion of the vehicle hull.

Another object of this invention is to provide a thrust compensator for propulsion shafts by using the hydrostatic pressure of the environment to produce a compensating thrust on the inboard end surface of the shaft that is equal to the thrust produced by the hydrostatic pressure on the exposed shaft end surface.

Other objects and features of the invention will become apparent to those skilled in the art upon reference to the accompanying specification, claims and drawings in which:

BRIEF DESCRIPTION OF THE DRAWING

The figure is a longitudinal cross section illustrating the principle of the thrust compensator and showing the structure of the compensator and housing therefor inside the hull of a submersible.

DESCRIPTION OF THE PREFERRED EMBODIMENT

Referring now to the figure, there is shown a hull 10 of a deep submergence vehicle. Piercing the hull 10 at the after end of the submergence vehicle, there is a propeller shaft 12, and attached thereto is a propeller 14. It is to be understood that the configuration shown in the drawing is merely exemplary of the configuration in that propellers and propeller shafts may be located in most any position on the hull of a deep submergence vehicle for the purposes of providing propulsion and movement of the vehicle in the buoyant medium in any of the six degrees of freedom.

Attached to the hull structure of the deep submergence vehicle and as shown in the figure, there is a housing and gear box 16 which contains seal and support bearing 18 which prevents the ingress of water from around the shaft 12 into the housing and gear box 16. Forward of the seal and support bearing 18 there is attached to the propeller shaft 12 a driven gear 20 which meshes with drive gear 22. Drive gear 22 is attached to drive shaft 24 rotated by the main propulsion systems (not shown) and is journaled to rotate in a bearing boss 26.

Forward of the gear drive assembly, comprising the gears 20 and 22, there is a forward seal and support bearing 28 surrounding the propeller shaft 12 to prevent the ingress of water from the forward end of the shaft 30 into the housing and gear box 16.

Adjacent the forward end surface area 30 of shaft 12 there is a cavity or chamber 32 in the housing and gear box 16 communicating with a port 34 in the hull 10 of the deep submergence vehicle via conduit 36. Conduit 36 may be closed or opened by any suitable valve such as a gate valve 38 (shown in diagrammatic form). The only thrust bearing needed is at the seal and support bearings 18 and 28 which contain both radial bearings for the support of the shaft and small thrust bearing components to provide for the thrust reaction due to propulsion.

DESCRIPTION OF THE OPERATION

As the vehicle, described as a deep submergence vehicle in this case, submerges below the surface of the ocean all external portions, including the hull 10, the propeller shaft 12, and the propeller 14 are subjected to the hydrostatic pressure of the water and the pressure being proportional to the depth to which the vehicle submerges. This hydrostatic pressure must be accounted for in the design of the hull 10 to eliminate the possibility of the hull 10 from crushing when subjected to these extremely high pressures. These pressures are of no particular consequence to the propeller shaft 12 about its periphery, but at its external end surface can produce tremendous thrust forces, as shown by force arrows 38, and must be compensated for as discussed earlier in the specification. By providing at the inner end surface 30 of the propeller shaft 12, a chamber or cavity 32 which communicates with the environmental water pressure through a suitable port 34 and conduit 36, there is created within this chamber 32 a pressure which exerts a force, shown by force arrows 40, precisely equal and opposite to that force produced by the environmental sea water pressure on the external end of the propeller shaft 12. Whether or not the deep submergence vehicle is at a depth of 10 feet or 10,000 feet the force 38, indicated by arrows, will be counteracted by the force 40 at the internal end of the propeller shaft. Therefore, the only thrust compensation required on the propeller shaft 12 is that required to counteract propulsion thrust reaction forces. This propulsion reaction thrust is, in the application described, frequently minimal compared to the hydrostatic thrust forces and may easily be counteracted by the use of small thrust bearing components within the seals and support bearings 18 and 28.

It is to be understood that the invention is not limited to the exact details of the construction shown and described, for obvious modifications will occur to persons skilled in the art.

What is claimed is:

1. A thrust compensator for use on a shaft having one end thereof subjected to a high envidonmental pressure comprising:

a housing and gear box for receiving a propeller shaft; an internal chamber within said housing and gear box; conduit means communicating with said chamber and said environmental high pressure; and
   a propeller shaft extending through said housing and gear box, the internal end thereof being exposed to said pressure in said chamber.

2. The thrust compensator of claim 1 further comprising;

a main seal and support bearing adjacent the after end of said shaft for precluding the ingress of water from the high pressure environment and for radially and axially supporting said shaft.

3. The thrust compensator of claim 2 further comprising:

a second seal and support bearing adjacent the forward internal end of said shaft for precluding the ingress of water from said chamber along the internal end of said shaft and axially and radially supporting the internal end of said shaft.

4. The thrust compensator of claim 3 further comprising:

drive gear means attached to the shaft interposed between said main and second seal and support bearings for rotating said shaft.

5. The thrust compensator of claim 4 further comprising:

valve means interposed in said conduit means for selectively controlling communication between said chamber and said environment.

References Cited
UNITED STATES PATENTS

| | | | |
|---|---|---|---|
| 2,590,560 | 3/1952 | Montelius | 103—128 |
| 2,924,181 | 2/1960 | Sennet | 103—128 |
| 3,125,975 | 3/1964 | Alsager et al. | 114—16 |

LEONARD H. GERIN, Primary Examiner

U.S. Cl. X.R.

114—16